April 3, 1956 D. STANIMIROVITCH 2,740,824
STORAGE BATTERIES
Filed July 31, 1953
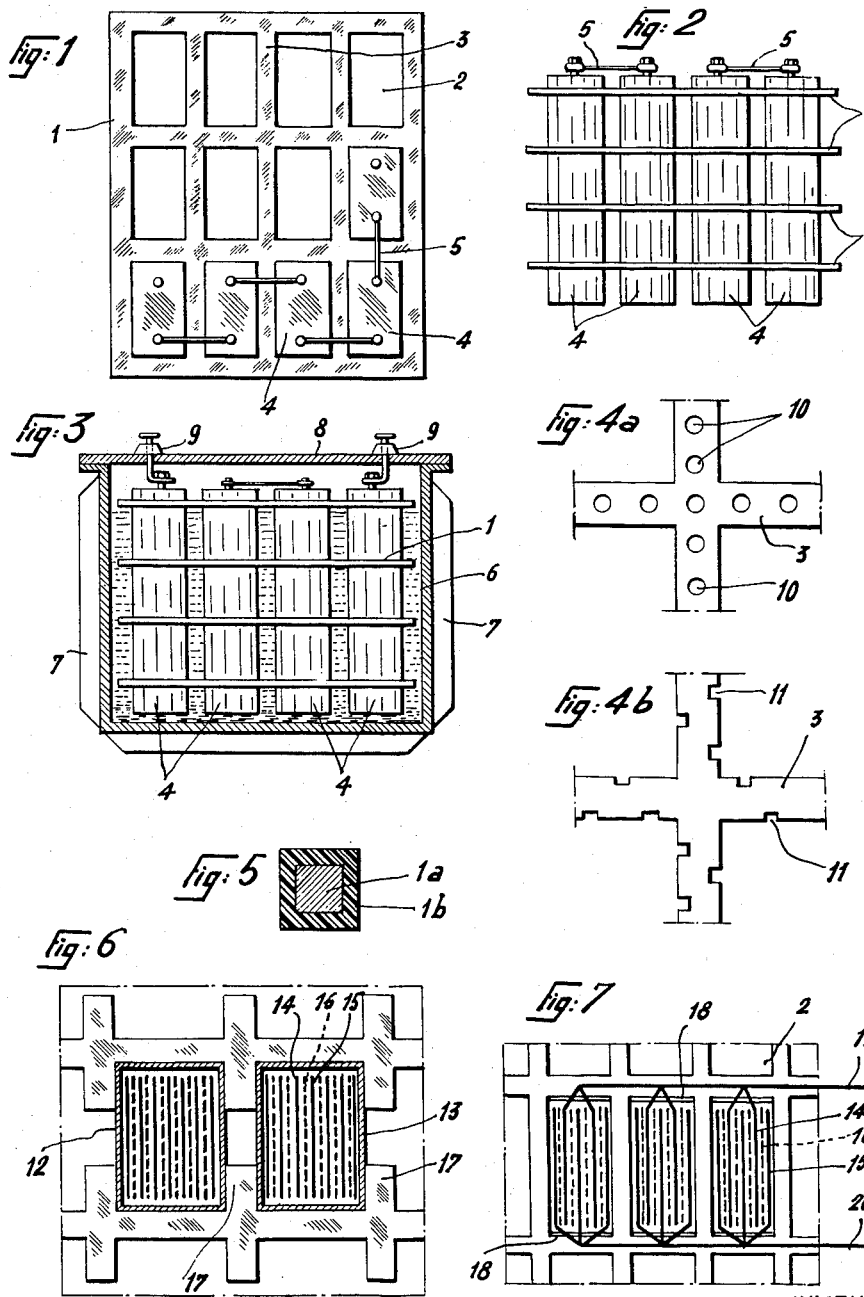
INVENTOR
DOUCHAN STANIMIROVITCH
BY
Kenyon & Kenyon
ATTORNEYS

United States Patent Office 2,740,824
Patented Apr. 3, 1956

2,740,824

STORAGE BATTERIES

Douchan Stanimirovitch, Paris, France, assignor to Societe des Accumulateurs Fixes et de Traction, Societe Anonyme, Romainville, France, a company of France Application July 31, 1953, Serial No. 371,484

Claims priority, application France August 5, 1952

9 Claims. (Cl. 136—171)

Storage batteries are already known which have permanently closed secondary cells, means being provided to preclude any release of gas from the cells while the battery is in operation.

Unlike conventional cell batteries in which losses of electrical energy result in electro-chemical reactions absorbing such energy with evolution of gases, lost electrical energy is translated into heat in closed secondary cells. It is thus necessary to make provision for dissipating heat outwardly with a view to avoiding any abnormal rise of temperature in secondary cell batteries as the operation might otherwise be disturbed.

It is a primary object of this invention to provide an improved storage battery having provision for an easy removal of heat as released within the various secondary cells constituting the storage battery.

A further object of this invention is to provide means for assembling secondary cells into a mechanically strong unit.

Another object is to prevent distortion of walls of casings for secondary cells, particularly to prevent bulging of such casings in the case of sealed or gastight cells.

Still another object is to maintain positive and negative plates in each secondary cell in contact with separators arranged between two adjacent plates having opposed polarities, by suitably squeezing the casing therefor.

A further object is to provide closed secondary cell storage batteries having a very high capacity.

According to an aspect of this invention, I provide a storage battery having not less than two secondary cells, wherein at least one rigid frame is provided around at least the plates and separators for each cell, transversely with respect to the same.

Such a rigid frame is preferably obtained by cutting out apertures in a rigid plate to provide accommodation for at least the plates and separators of each cell, the apertured plate substantially amounting to a netting the bars of which provide individual frames for each cell.

A plurality of vertically spaced apart nettings may advantageously be distributed over the height of the cells.

With such an arrangement, a cooling fluid can be passed around and between the various cells parallelly to the rigid frames; furthermore the rigid frame or frames may be made of a heat conductive material to contribute in the removal of heat.

The main component elements for each cell may be enclosed in a casing say a thin prismatic casing which contains an electrolyte as required for operation. In that case, the cooling fluid may be air which is passed around the various casings, or it may be a liquid, preferably an insulating liquid, for example oil.

Where electrically insulated casings are provided, the frames may be made of metal. On the contrary where metal casings are employed the frames may be made of or coated with insulating material.

Natural or forced passage of cooling fluid may take place solely in parallel relationship with the frame where the frame has a tight fit or is in frictional contact with the cells. It is also possible to indent the frame edges to allow a passage of cooling fluid through the indentations in a direction at right angles to the frame.

Where only cell plates and separators are set in a frame or frames the assembly may be arranged in a common casing or vessel which contains an electrolyte, and the various cells connected in parallel provide in effect one storage battery of high capacity in which the electrolyte moving between the individual cells provides a cooling fluid for said cells.

The invention is illustrated by the drawings in which:

Fig. 1 is a plan view of an apertured frame of the netting type, a number of apertures being occupied by secondary cells.

Fig. 2 is a side elevation of a storage battery having secondary cells held together in apertured frames as shown on Fig. 1.

Fig. 3 is a side elevation partly in section of a vessel containing a liquid, for receiving a storage battery as shown on Fig. 2.

Figs. 4a and 4b are portions shown on an enlarged scale of netting bars.

Fig. 5 is a cross-section of a netting bar.

Fig. 6 is a plan view showing a portion of a modified apertured frame, and two secondary cells accommodated therein, said cells being shown in horizontal cross-section.

Fig. 7 is a plan view of an apertured frame in the apertures of which three sets of plates and separators (shown in horizontal cross-section) are accommodated.

The apertured frame 1 shown on Fig. 1 is a rectangular, flat plate or sheet in which rectangular apertures 2 have been cut out, leaving criss-cross bars 3. Inserted with a close fit into each aperture 2 for frictional engagement is a secondary cell 4 having a corresponding prismatic form; the casing for the plates and separators of said cell may be made for example of polythene or alternatively steel sheet. As shown on Fig. 2, there may be provided a plurality of vertically spaced apart apertured frames 1 which secure a mechanical assembly of the various cells 4 into a battery, the outer terminal of the cells being connected, for example in series, by conductors 5.

Each cell is thus tightly encased so that the casing thereof can resist distortion while air can freely pass between adjacent cells. Where the apertured frames are made of metal, heat is additionally removed by conduction through the netting bars. Where the cell casings are metallic the apertured frame may be made of a metal core 1a coated with an insulating material 1b (Fig. 5). The apertured frame may also be made wholly of insulating material. In the latter case, the cell casings are thus both mechanically assembled together and electrically insulated from each other.

A unit as shown on Fig. 2 may be arranged (Fig. 3) in a metal vessel 6 containing a cooling liquid such as oil. The vessel may be furnished with cooling fins 7. Furthermore it may be closed by a lid 8 through which terminals 9 for employing the battery are passed.

Where large amounts of heat are to be removed, a pump or the like may be operatively associated with vessel 6 to drive oil from the same and pass it through an outer cycle comprising a cooler and then recycle it to the vessel.

For an easier natural or forced circulation of cooling fluid vertically through the superimposed apertured frames 1, additional apertures 10 (Fig. 4a) and/or notches 11 preferably arranged in staggered relationship (Fig. 4b) may be provided in the frames. Where the frames are rigid enough, some of the bars running in one direction may be interrupted at 12 (Fig. 6). Each secondary cell comprising casing 13, positive plates 14, negative plates 15 and separators 16 is thus held in the direction at right angles to plates 14, 15 by continuous bars and in the direction parallel to said place by bar sections 17. The risk of bulging which is greater in the direction at right angles to the plates is thus avoided; the plates are securely held in contact with the separators and the circulation of cooling fluid around the cells is facilitated.

Figs. 1 to 6 relate to batteries of individual cells mounted in series.

Fig. 7 illustrates a mounting in parallel.

In this case, the plates 14, 15 and separators 16 for each cell are accommodated directly in frame apertures 2, possibly with intervening insulating plates 18 where the frame is made of conducting material. All plates 14 and all plates 15 are interconnected by conductors 19, 20 as diagrammatically shown. The combination is immersed in an electrolyte contained in a vessel (not shown); it is the electrolyte which provides the cooling fluid.

In that case, the frames are preferably made of metal and it is desirable to have the outer edge thereof fast say by welding with the vessel wall which is also made of metal and is preferably provided with cooling fins like vessel 6 shown on Fig. 3. Thus additionally to the cooling effected by the electrolyte there is further cooling which results from heat conductivity of frames.

It is thereby possible to build storage battery elements having a very high capacity, particularly gas tight or sealed elements in which the risks of heating during overcharging are thoroughly avoided.

The apertured frames where the secondary cells have an insulating casing or are electrically insulated from said frames, are preferably made of as light a metal as possible, desirably aluminum, magnesium or a light alloy mainly composed of such metals. Where the apertured frames are exposed to contact with an alkaline electrolyte, they should be made of a material unaffected by such an electrolyte, for example steel or copper.

The specific details given in the foregoing description of examples purport to illustrate how this invention may be carried out, but they are not limiting, and the invention includes those variations and modifications which are within the scope of the following claims.

What I claim is:

1. A storage battery comprising a plurality of individually sealed cells each including a casing and all assembled in geometric parallel relationship, a plurality of rigid frames of thick cross section each having cross bars of like thick cross section defining openings through which the respective individual casings extend in close fitting relationship with wide surfaces of said thick cross bars to avoid cutting into the casings, said frames being spaced from each other along the lengths of said cells and serving to maintain the cells in fixed spaced apart relationship to permit circulation of cooling medium about the individual cells and also serving to prevent bulging of the cell casing walls under internal cell pressure, and means for circulating cooling media around said cells.

2. A storage battery comprising a plurality of individually sealed cells each including a casing and all assembled in geometric parallel relationship, a plurality of rigid frames of thick cross section each having cross bars of like thick cross section defining openings through which the respective individual casings extend in close fitting relationship with wide surfaces of said thick cross bars to avoid cutting into the casings, said frames being spaced from each other along the lengths of said cells and serving to maintain the cells in fixed spaced apart relationship to permit circulation of cooling medium about the individual cells and also serving to prevent bulging of the cell casing walls under internal cell pressures, and said cross bars having auxiliary passageways to further facilitate circulation of the cooling medium about the cells, and means for circulating cooling media around the cells.

3. A storage battery comprising a vessel for cooling medium, a plurality of individual sealed cells each including a casing with all cells assembled in geometric parallel relationship in the vessel, a plurality of rigid frames of thick cross section each having cross bars of like thick section defining openings through which respective casings extend individually in close fitting relationship with wide surfaces of said thick cross bars to avoid cutting into the casings, said frames being spaced from each other along the lengths of said cells and serving to maintain the cells in fixed spaced apart relationship to permit circulation of said cooling medium about the major portions of the casings of the cells and also serving to prevent bulging of the cell casing walls under internal cell pressures.

4. The battery of claim 2, wherein the casings are of conductive material and the frames are insulated therefrom.

5. The battery of claim 2 wherein the casings are of conductive material and the frames are of conductive material coated with insulating material.

6. The battery of claim 2, wherein the casings are of conductive material and the frames are of thick insulating reinforced material.

7. The battery of claim 2, wherein the casings are of insulating material and the rigid frames are of conductive material.

8. The battery of claim 3 in which the rigid frames are secured to the vessel.

9. A storage battery comprising a vessel for cooling medium, a plurality of individual sealed cells each including a casing with all cells assembled in geometric parallel relationship in the vessel, a plurality of rigid frames of thick cross section each having cross bars of like thick section defining openings through which respective casings extend individually in close fitting relaship with wide surfaces of said thick cross bars to avoid cutting into the casings, said frames being spaced from each other along the lengths of said cells and serving to maintain the cells in fixed spaced apart relationship to permit circulation of said cooling medium about the major portions of the casings of the cells and also serving to prevent bulging of the cell casing walls under internal cell pressures, and said cross bars having auxiliary openings to further facilitate circulation of the cooling medium about the cells.

References Cited in the file of this patent

UNITED STATES PATENTS

| | | |
|---|---|---|
| 930,728 | Chamberlain et al. | Aug. 10, 1909 |
| 1,036,063 | Bedell et al. | Aug. 20, 1912 |
| 1,152,247 | Walker | Aug. 31, 1915 |
| 1,313,512 | Bedell et al. | Aug. 19, 1919 |
| 1,546,422 | Whitehead | July 21, 1925 |
| 2,666,091 | Martin et al. | Jan. 12, 1954 |